Nov. 17, 1931.  B. M. SHORT  1,832,512
BUMPER
Filed May 9, 1930
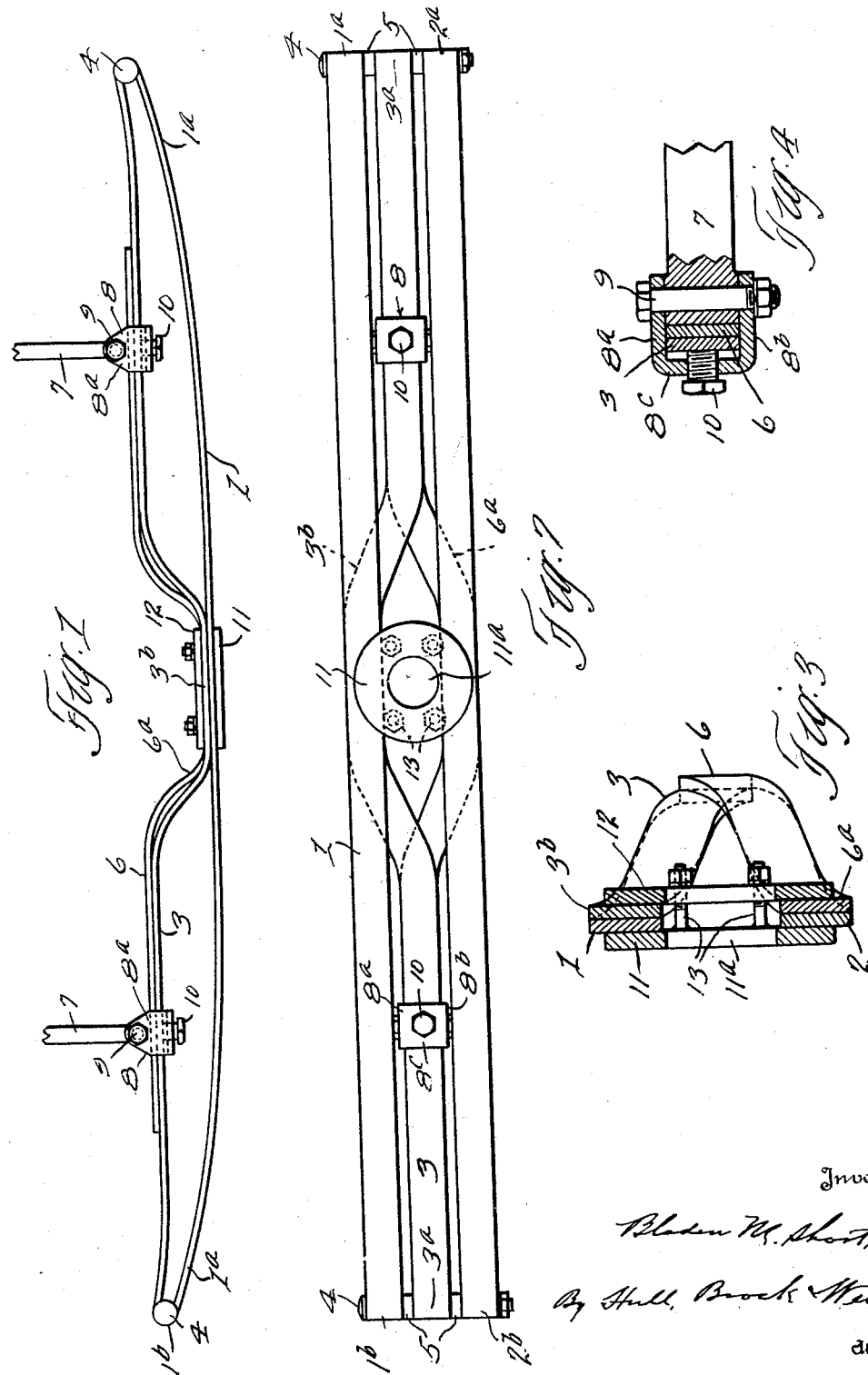

Patented Nov. 17, 1931

1,832,512

UNITED STATES PATENT OFFICE

BLADEN M. SHORT, OF DETROIT, MICHIGAN

BUMPER

Application filed May 9, 1930. Serial No. 450,905.

This invention relates to bumpers for automobiles, and has for its principal object to provide a bumper of this character comprising an impact section consisting of a plurality of vertically spaced impact bars and a rear auxiliary or reinforcing section wherein the central portion of the front or impact section will be effectively strengthened by the rear section and wherein it will be possible to insert a starting crank between the impact bars without sacrificing the strength of the bumper.

The bumper shown herein is of the general type shown in McGregor Patent No. 1,372,154, issued March 22, 1921, and comprising a front or impact section consisting of a plurality of vertically spaced bars and connected at their ends to the ends of a rear or auxiliary section, the central portion of which is arched forwardly to form a trussed reinforcement for the central portions of the front or impact bars.

In the drawings Fig. 1 represents a plan view of a bumper constructed in accordance with my invention, the said view showing portions of the supporting arms and of the means for securing the bumper thereto; Fig. 2 a front elevation of the bumper shown in Fig. 1; Fig. 3 a detail in section of the bumper clamping means; and Fig. 4 a detail in section of the bumper securing and supporting means.

Describing the various parts by reference characters, 1 denotes the upper and 2 the lower front or impact bars, each of the aforesaid bars having its ends curved rearwardly, as indicated at 1ª on Fig. 1, and each provided at each end thereof with an eye, the eyes of the bar 1 being indicated at 1ᵇ and the eyes on the ends of the bar 2 being indicated at 2ᵇ.

Cooperating with the front or impact section comprising the bars 1 and 2 is a composite rear or auxiliary section, and this latter section comprises a main bar 3 which is provided at each end thereof with an eye 3ª adapted to be interposed between the eyes 1ᵇ and 2ᵇ and to be connected therewith by means of bolts 4 and spacing washers 5. The central section of the bar 3 is bent toward and preferably into engagement with the central portion of the upper bar 1, being deflected both upwardly and forwardly as shown at 3ᵇ, so that the central portion of the bar 3 will register with and be covered by the central portion of the bar 1.

In addition to the bar 3, a shorter bar 6 is employed, being located at the back of the bar 3 and being of such length that its ends may be clamped to the arms 7 (which arms may be the front ends of the vehicle frame) by the clamps 8 which secure the bar 3 to said arms. These clamps may be of any standard construction, but I prefer to employ U-shaped clamps each comprising upper and lower members 8ª and 8ᵇ having their rear ends connected to the arms 7 by bolts 9 and having in the front plate 8ᶜ thereof a short clamping bolt 10 adapted to force the bars 3 and 6 against the end of the arms 7.

This central portion of the bar 6 is deflected forwardly and downwardly, as shown at 6ª and is preferably in engagement with and directly behind and in register with the lower front bar 2.

The central portions of the bars 1, 2, 3 and 6 are connected by means of a front clamping plate and rear clamping plates, the front clamping plate 11 being of any desired form which will provide an opening 11ª for the reception of the starting crank, while of a vertical extent to overlap sufficiently the front surfaces of the bars 1 and 2. For a rear clamping plate, I prefer to employ a plate 12 similar to the front clamping plate, its upper and lower ends overlapping to a sufficient extent the portions 3ᵇ and 6ª of the bars 3 and 6, respectively. The clamping plates 11 and 12 are connected by bolts 13 carried by the front plate 11.

Due to the construction and arrangement of the parts shown herein, I have provided a bumper of the type comprising a front or impact section consisting of spaced impact bars, and a rear auxiliary reinforcing section, with simple and effective means whereby the central section of the bumper is strengthened and provision is made for the insertion of the starting crank therethrough.

Having thus described my invention, what I claim is:—

1. A bumper comprising a front or impact section having a pair of vertically spaced bars and a rear or auxiliary section comprising a continuous rear bar having its ends connected to the ends of the front or impact bars and having its central portion projected toward the central portion of the impact section and being deflected into substantial register with one of said impact bars, and a second rear bar secured to the former rear bar and having its central portion projected toward the central portion of the impact section and also being deflected into substantial register with the other of the aforesaid impact bars, and means for clamping together the central portions of the aforesaid bars with the provision in such clamping means of a space for the reception of a starting crank.

2. A bumper comprising a front or impact section having a pair of vertically spaced bars and a rear or auxiliary section comprising a continuous rear bar having its ends connected to the ends of the front or impact bars and having its central portion deflected into substantial register with the back of one of said bars, and a second auxiliary bar secured to the former rear bar and having its central portion deflected into substantial register with the back of the other of the aforesaid impact bars, and means for clamping together the central portions of the aforesaid bars with the provision of a space for the reception of a starting crank.

3. A bumper comprising vertically spaced front or impact bars and a rear or auxiliary bar having its ends connected to the ends of the impact bars and having its central portion projected toward the front or impact bars and also deflected vertically to substantially register with one of the impact bars, and a second rear or auxiliary bar having its ends connected to portions of the first mentioned bar intermediate the ends and central portion thereof and having its central portion projected toward the front or impact bars and deflected vertically into substantial register with the other of said impact bars, and common clamping means securing the central portions of the said bars together and providing an opening for the reception of a starting crank.

4. A bumper comprising vertically spaced front or impact bars and a rear or auxiliary bar having its ends connected to the ends of the impact bars and having its central portion projected toward the front or impact bars and also deflected vertically to substantially register with one of the impact bars, and a second rear or auxiliary bar having its ends connected to the first mentioned bar and having its central portion projected toward the front or impact bars and deflected vertically into substantial register with the other of said impact bars, and means for securing the central portions of the said bars together.

5. A bumper comprising vertically spaced front or impact bars and a rear or auxiliary bar having its ends connected to the ends of the impact bars and having its central portion projected toward the front or impact bars and also deflected vertically to substantially register with one of the impact bars, and a second rear or auxiliary bar having its central portion projected toward the front or impact bars and deflected vertically into substantial register with the other of said impact bars, means for securing the central portions of the said bars together, supporting arms for the bumper, and common means for clamping the second rear bar to the first rear bar and for securing both of said bars to said arms.

6. A bumper comprising vertically spaced front or impact bars and a rear or auxiliary bar having its ends connected to the ends of the impact bars and having its central portion projected toward the front or impact bars and also deflected vertically to substantially register with one of the impact bars, and a second rear or auxiliary bar having its central portion projected toward the front or impact bars and deflected vertically into substantial register with the other of said impact bars, common clamping means for securing the central portions of the said bars together and for providing an opening for the reception of a starting crank, supporting arms for the bumper, and common means for clamping the second rear bar to the first rear bar and for securing both of said bars to said arms.

7. A bumper comprising vertically spaced front or impact bars and a rear or auxiliary bar having its ends connected to the ends of the impact bars and having its central portion projected toward the front or impact bars and also deflected vertically to substantially register with one of the impact bars, and a second rear or auxiliary bar located at the rear of the first mentioned rear or auxiliary bar and having its central portion projected toward the front or impact bars and deflected vertically into substantial register with the other of said impact bars, means for securing the central portions of the said bars together, supporting arms for said bumper, substantially U-shaped clamping members each having a front portion and upper and lower portions extending rearwardly from the front portion and adapted to receive the two rear bars therebetween, means for securing the rear ends of the upper and lower portions of said clamping members to the said arms, and bolts carried by the front portions of the said clamping members for pressing the portions of the rear bars within the said clamping members against the ends of said arms.

8. A bumper comprising vertically spaced front or impact bars and a rear or auxiliary bar having its ends connected to the ends of the impact bars and having its central portion projected toward the front or impact bars, and a second rear or auxiliary bar located at the rear of the first mentioned rear or auxiliary bar and having its central portion projected toward the front or impact bars, means for securing the central portions of the said bars together, supporting arms for said bumper, substantially U-shaped clamping members each having a front portion and upper and lower portions extending rearwardly from the front portion and adapted to receive the two rear bars therebetween, means for securing the rear ends of the upper and lower portions of said clamping members to the said arms, and bolts carried by the front portions of the said clamping members for pressing the portions of the rear bars within the said clamping members against the ends of said arms.

9. A bumper comprising vertically spaced front or impact bars and a rear or auxiliary bar having its ends connected to the ends of the impact bars and having its central portion projected toward the front or impact bars and also deflected vertically to substantially register with one of the impact bars, and a second rear or auxiliary bar located at the rear of the first mentioned rear or auxiliary bar and having its central portion projected toward the front or impact bars and deflected vertically into substantial register with the other of said impact bars, common clamping means for securing the central portions of the said bars together while providing an opening for the reception of a starting crank, supporting arms for said bumper, and means for securing both of the rear bars to said supporting arms and for clamping the said bars together.

10. A bumper comprising an impact section having a pair of spaced bars and an auxiliary section comprising an auxiliary bar having its ends connected to the ends of the impact bars and having its central portion deflected into substantial register with one of said impact bars, and a second auxiliary bar secured to the first auxiliary bar and having its central portion deflected into substantial register with the other of said impact bars, and means for clamping together the central portions of the bars with the provision of a space for the reception of a starting crank.

11. A bumper comprising an impact section having a pair of spaced bars and an auxiliary section comprising an auxiliary bar having its ends connected to the ends of the impact bars and having its central portion deflected into substantial register with one of said impact bars, and a second auxiliary bar secured to the first auxiliary bar and having its central portion deflected into substantial register with the other of said impact bars, and means for clamping together the central portions of the bars.

12. A bumper comprising a front or impact section having a pair of spaced bars and an auxiliary section comprising a continuous auxiliary bar having its ends connected to the ends of the impact bars and having its central portion deflected into substantial register with one of said bars, and a second auxiliary bar secured to the first auxiliary bar and having its central portion deflected into substantial register with the other of the aforesaid impact bars, and means for clamping together the central portions of the bars.

13. A bumper comprising a front or impact section having a pair of spaced bars and an auxiliary section comprising a continuous auxiliary bar having end portions connected to and disposed between the impact bars and having its central portion deflected into substantial register with one of said bars, and a second auxiliary bar secured to the first auxiliary bar and having its central portion deflected into substantial register with the other of the aforesaid impact bars, and means for clamping together the central portions of the bars.

14. A bumper including impact bars, reinforcing bars therefor, and means for connecting said reinforcing bars together and supporting said bumper, said means including a supporting arm, a clamping member for cooperation with said arm, said member having a front portion and upper and lower portions extending rearwardly from the front portion for receiving the reinforcing bars therebetween, means for pivotally securing the upper and lower portions of said clamping member to said supporting arm, and means carried by the front portion of said member for pressing the reinforcing bars against said arm.

In testimony whereof I hereunto affix my signature.

BLADEN M. SHORT.